Aug. 8, 1944.  C. E. TACK  2,355,120
ROTOR BRAKE
Filed Dec. 3, 1941  5 Sheets-Sheet 1

INVENTOR.
Carl E. Tack
BY
ATTORNEY

Aug. 8, 1944.  C. E. TACK  2,355,120
ROTOR BRAKE
Filed Dec. 3, 1941  5 Sheets-Sheet 2
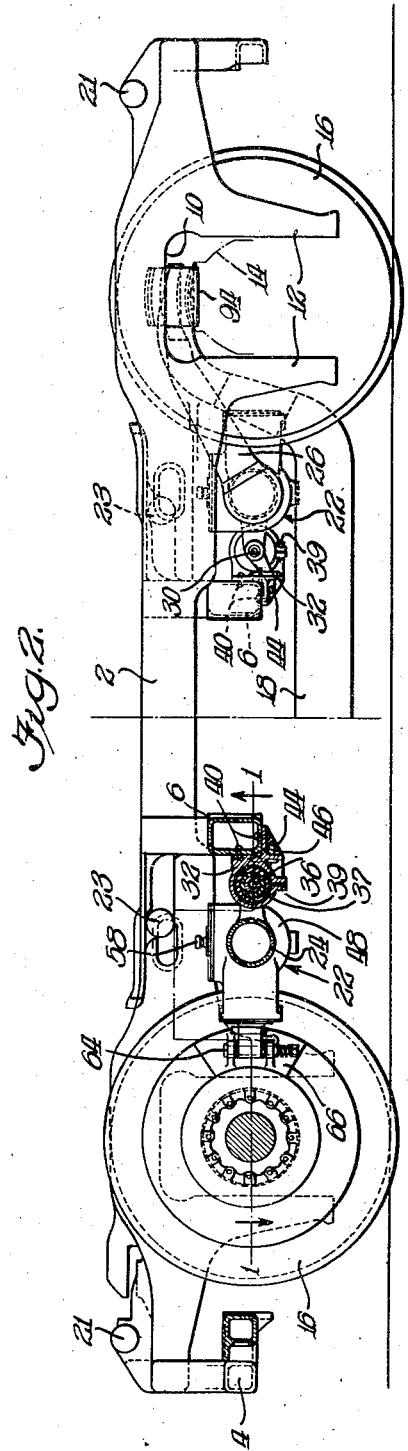
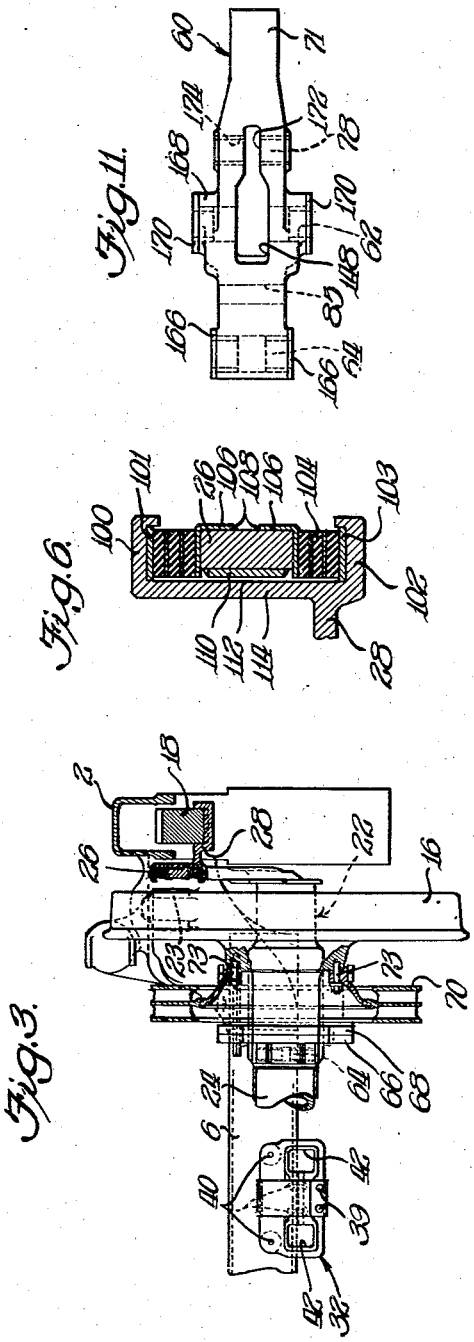
INVENTOR.
Carl E. Tack
BY
ATTORNEY

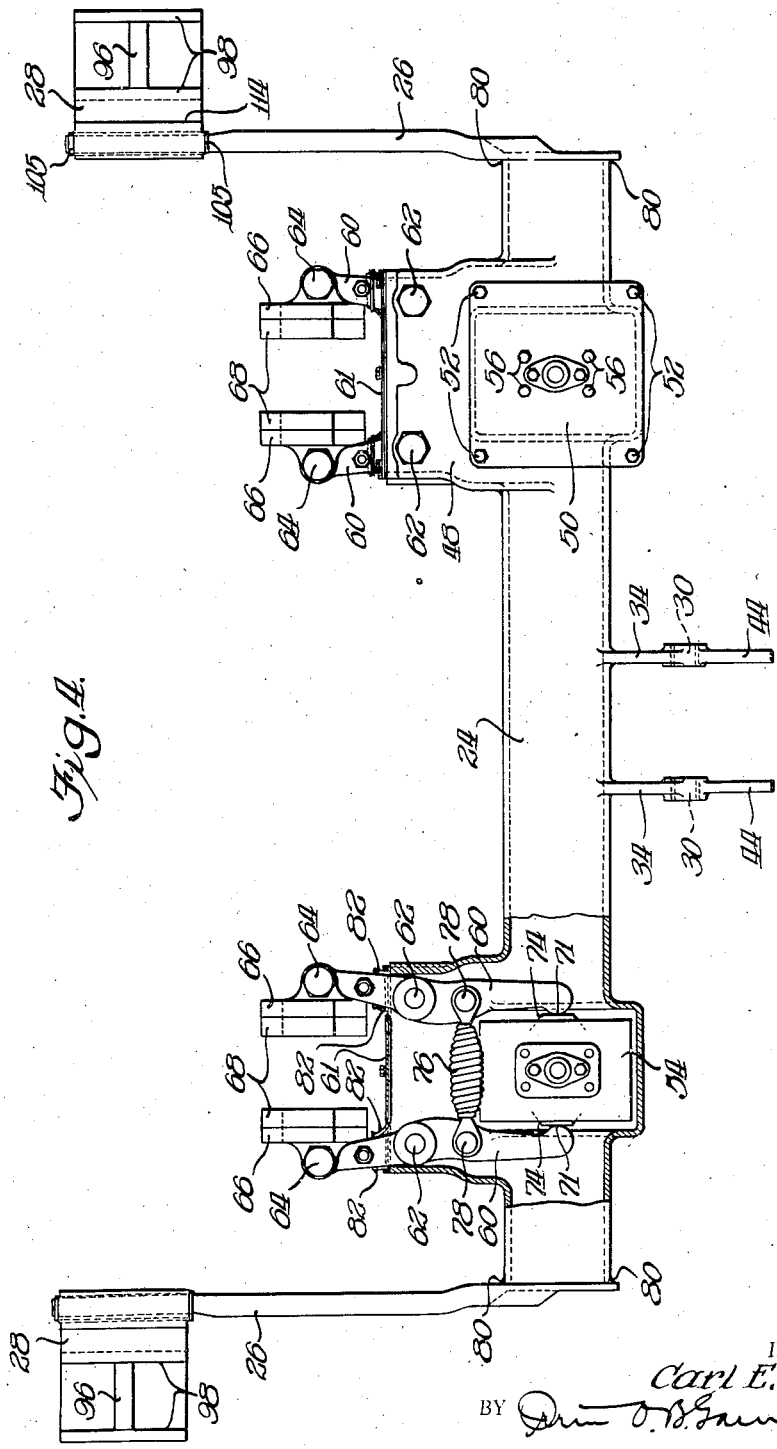

Aug. 8, 1944.  C. E. TACK  2,355,120
ROTOR BRAKE
Filed Dec. 3, 1941  5 Sheets-Sheet 4
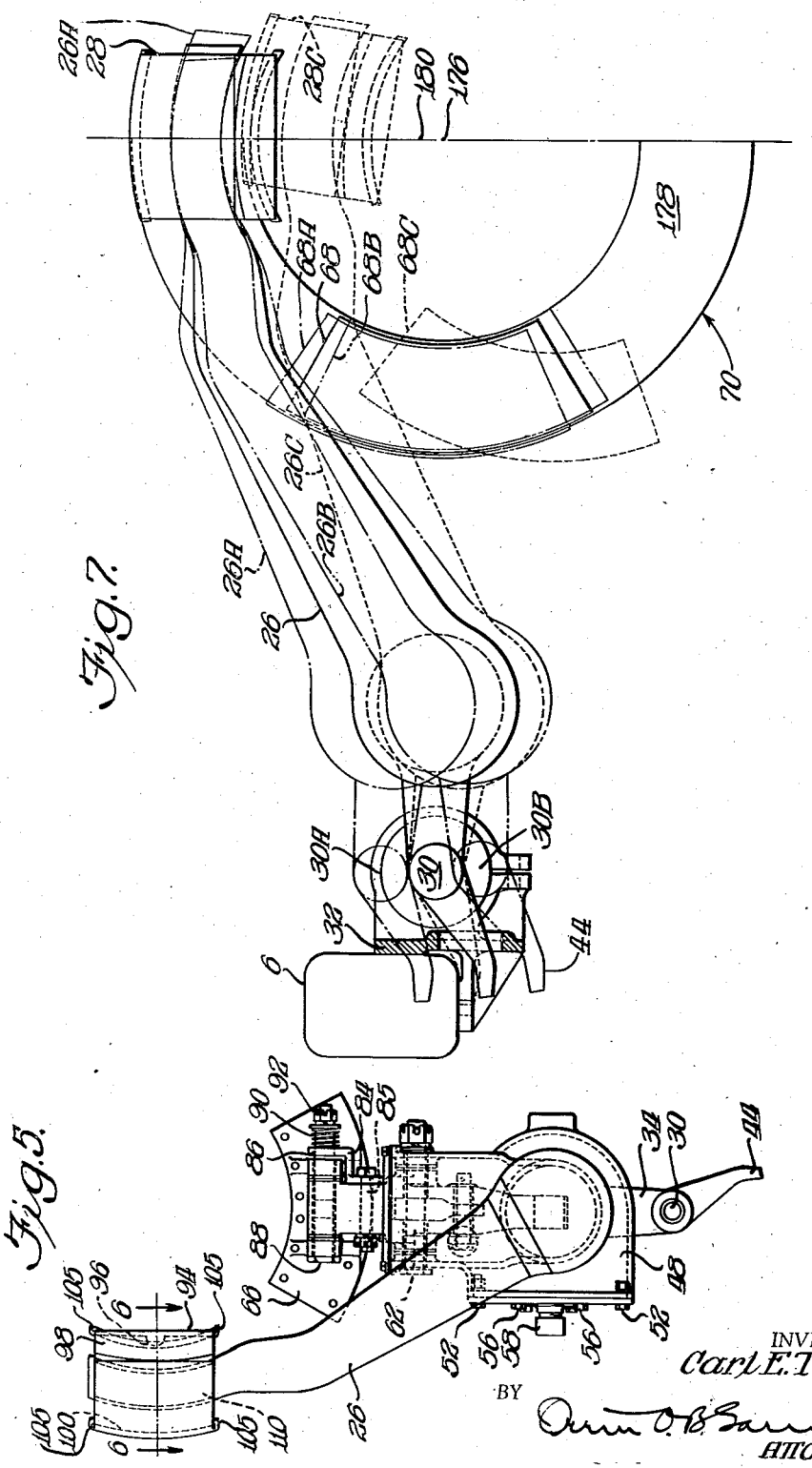
INVENTOR.
Carl E. Tack
BY
ATTORNEY

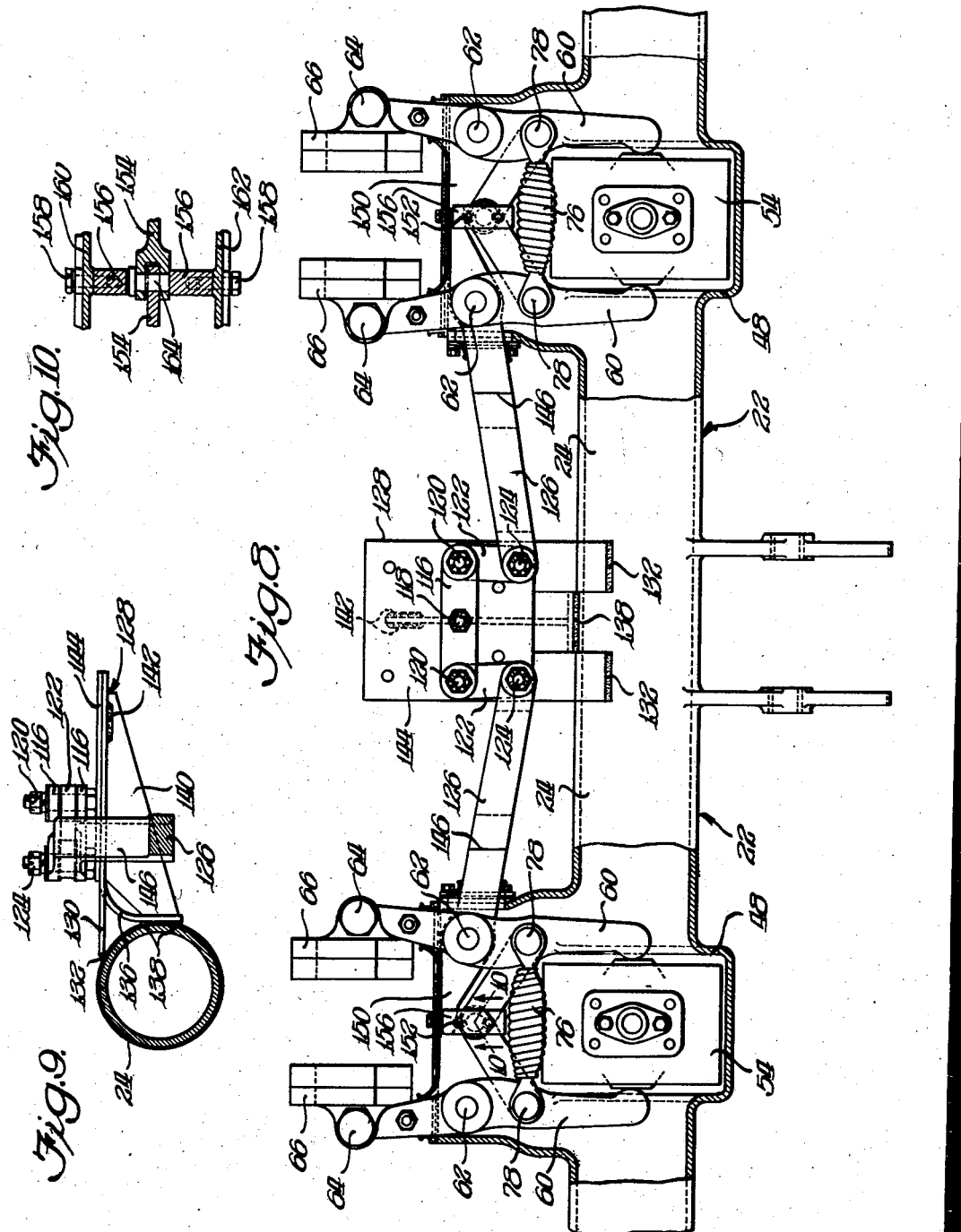

Patented Aug. 8, 1944

2,355,120

UNITED STATES PATENT OFFICE 2,355,120

ROTOR BRAKE

Carl E. Tack, Chicago, Ill., assignor to American Steel Foundries, Chicago, Ill., a corporation of New Jersey Application December 3, 1941, Serial No. 421,418

33 Claims. (Cl. 188—59)

My invention relates to a brake arrangement for a railway car truck and especially to a brake design commonly called off-wheel, wherein brake drums are supported to rotate with the wheel and axle assembly to afford braking surfaces independently of the tread surfaces of the wheels.

The general object of my invention is to devise an off-wheel brake arrangement wherein braking discs are supported to rotate with each wheel and axle assembly and a brake frame is carried by the truck frame and supports levers with brake shoes for frictional engagement at opposite sides of each brake disc.

A specific object of my invention is to devise such an arrangement as that described wherein the brake frame member supported at each end of the truck may be supported adjacent journal boxes at opposite sides of the truck and may be afforded a further torque connection at an intermediate point of the truck, thus providing a three point frame support.

A different object of my invention is to provide a three point brake frame support such as that described, so mounted that the shoes carried thereon will be supported eccentrically with respect to the wheel and axle assembly on which the brake discs are mounted so that a washing action may be afforded said shoes against the adjacent discs thus preventing the formation of concentric grooves in the brake surfaces of the discs.

In my novel mounting arrangement each of the three points of support for each brake frame is resiliently mounted, and said resilient supports serve to accommodate the eccentric movements of the brake frame with respect to the rotatable wheel and axle assembly.

A more specific object of my invention is to afford a three point brake frame for each wheel and axle assembly of a railway car truck, wherein two of said support points consist of eccentric connections adjacent the journal boxes of the associated wheel and axle assembly and the third support point consists of a fulcrum connection to a portion of the frame which may be resiliently supported in usual manner on said journal boxes for vertical movement with respect thereto, as is customary in railway car trucks.

A different object of my invention is to provide a novel form of truck connection between a brake frame such as that described and an adjacent portion of the truck frame, said connection comprising a pivotal arrangement and means on said brake frame having abutment with said truck frame to limit the rotational movement of said brake frame with respect to said truck frame.

Yet another object of my invention is to devise a three point supported brake frame with resilient connections at each support point which will be adapted to relative lateral movement of the wheel and axle assembly on which two of said support points are carried, and the truck frame, where the other support point has a torque connection.

Yet another specific object of my invention is to devise a novel form of combined equalizer seat and brake frame support casting which may seat upon each journal box and afford support for one end of the adjacent equalizer and an adjacent connection for one end of the associated brake frame, said last-mentioned connection affording limited, resiliently controlled vertical and lateral motion of said brake frame with respect to said equalizer.

Yet a different object of my invention is to provide a novel form of bearing means for said brake frame adapted to support said brake frame in a position avoiding interference with the wheel and axle assemblies during necessary wheel changes. My invention also comprehends such an arrangement of said brake frame and the associated levers and parts as will facilitate the removal or change of the associated wheel and axle assemblies while said brake frame and associated parts remain in normal assembled relationship.

My invention also contemplates a novel form of support for each brake head mounted on the brake frame, said brake head being so connected to the associated lever as to permit it to accommodate to varying angles of application to the braking surfaces of the associated disc, and at the same time to maintain said head in its normal position with respect to the associated lever when released.

Yet a different object of my invention is to devise such a brake frame as that described wherein the power means for actuation of the levers associated with said frame may be so mounted on said brake frame as to permit easy application or removal, said brake means comprising a brake cylinder especially designed for application or removal as a simple cartridge within a specially constructed chamber of said brake frame.

Still another object of my invention is to devise a novel form of hand brake arrangement suitable for use with my novel off-wheel brake as herein described.

In the drawings Figure 1 is a top plan view of a railway car truck embodying my invention, the left half thereof partly in section with the section being taken approximately in the horizontal planes indicated by the lines 1—1 of Figure 2, portions of the truck frame being omitted therefrom.

Figure 2 is a side elevation of the truck and brake arrangement shown in Figure 1, also partly in section, the section being taken substantially in the vertical longitudinal plane bisecting the truck as indicated by the line 2—2 of Figure 1.

Figure 3 is a further partially sectional view of the truck and brake arrangement shown in Figures 1 and 2, the section being taken approximately in the transverse vertical planes indicated by the line 3—3 of Figure 1.

Figure 4 is a top plan view of my novel brake arrangement with the associated parts, and Figure 5 is an elevation thereof taken from the right as seen in Figure 4, and Figure 6 is a sectional view through the end of the torque arm and the equalizer seat associated therewith, said section being taken substantially in the transverse vertical plane indicated by the line 6—6 of Figure 5.

Figure 7 is a somewhat diagrammatic view illustrating the mounting of the brake frame with respect to the truck frame and the axis of the supporting wheel and axle assembly and shows the relative positions of the various parts under normal conditions and under conditions of extreme spring travel both upwardly and downwardly.

Figure 8 is a top plan view of the brake frame and the associated parts, said view being comparable to Figure 4 but showing in addition the manner of application thereto of hand brake means.

Figure 9 is a fragmentary sectional view through the brake frame shown in Figure 8 illustrating the support for the hand brake means.

Figure 10 is a fragmentary sectional view through a pivotal connection of the actuating links forming a part of the hand brake means, said section being taken substantially in the planes indicated by the line 10—10 of Figure 8.

Figure 11 is a side elevation of my novel form of brake lever, the view being taken from the face of the lever adjacent the associated power means.

Figure 1:
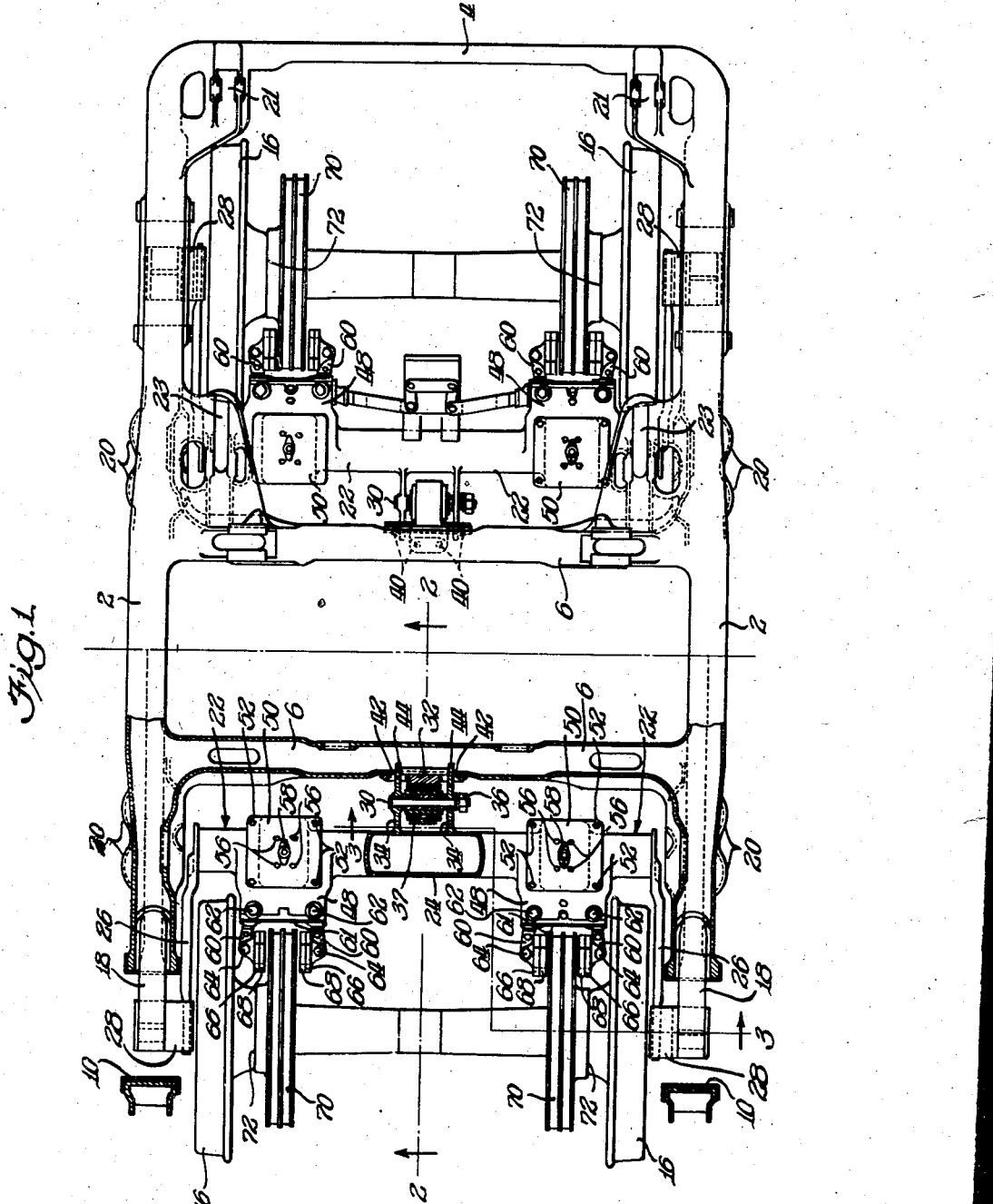

Describing the structure in detail and referring first to the general arrangement thereof as illustrated in Figures 1 to 4 inclusive, my novel brake arrangement may be applied to a railway car truck frame of well known form, said frame comprising spaced side frame members 2, 2, an end rail 4 at each end of the truck sharply offset downwardly adjacent its connection to the side frame as may best be seen from a consideration of the end view of Figure 2, and spaced transoms 6, 6 also offset downwardly for a similar purpose, namely to afford maximum space for the car body which may be carried on the bolster (not shown) normally supported between said transoms.

Each side frame 2 may have at opposite ends thereof the usual pedestal opening 10 defined by pedestal jaws 12, 12 at opposite sides thereof, each of said pedestal jaws affording means of connection to an associated journal box 14 serving as the usual means of connection to the adjacent wheel and axle assembly 16. A journal box 14 is fragmentarily illustrated in Figure 2 right for the purpose of showing the manner of connection thereto. The frame structure also comprises at each side thereof an equalizer 18 opposite ends of which may be supported as usual, on the journal boxes, the detail of the support means being modified for a special purpose as hereinafter more particularly described. Each equalizer 18 may support at intermediate points spring means (not shown), the opposite ends of which may be housed in the spring pockets 20, 20 (Figure 1) formed on the side frame 2, 2, the main frame casting thus being resiliently supported from said equalizers in the usual manner. The truck frame as illustrated is arranged for the usual brake hangers (not shown), adjacent the extremities of the truck as at 21, 21 and intermediate the wheels as at 23, 23.

In my novel arrangement a brake frame generally designated 22 may be supported at each end of the truck structure, each brake frame 22 comprising a transverse beam 24 here illustrated as a tubular member with torque arms 26, 26, integrally formed therewith at opposite ends thereof thus defining a C-frame. The extremity of each torque arm may be resiliently supported from an adjacent journal box by means of an equalizer seat 28, to be hereafter described in detail, and an intermediate portion of the beam 24 may be pivotally connected as at 30 to the torque bracket 32 secured on the adjacent transom. The manner of connection of the brake frame to the torque bracket 32 may best be seen from a consideration of the horizontal and vertical sections therethrough as illustrated in Figures 1 and 2. It may be noted that said connection comprises spaced arms 34, 34 extending on opposite sides of the torque bracket 32 and connected thereto by means of the pivot pin 36. The connection at the pivot point 30 is made somewhat flexible by means of the tubular rubber spring 38, said spring comprising alternate layers of metal and rubber tubular in form and sleeved upon each other, the inner metal sleeve being seated upon the pin 36 and the outer metal sleeve being bushed within the cylindrical portion 37 of the torque bracket 32, said cylindrical portion being split along its lower edge and formed with lugs which may be bolted together as at 39, 39 (Figure 3) for tightly securing said rubber spring within said bracket. By this means, relative lateral motion is permitted between the brake frame and the truck frame to the transom of which the brake frame is connected. The torque bracket 32 is, of course, fixed on the transom 6 and may be secured thereto as at 40, 40, said bracket being somewhat rectangular in elevation as best seen in the sectional view of Figure 3. The bracket 32 may project below the supporting transom 6 and at each side thereof may be afforded an opening 42 through which may project the extremities 44, 44 of the before-mentioned spaced arms 34, 34. The openings 42, 42 are sufficiently large to permit the before-mentioned lateral motion of the brake frame with respect to the truck frame and the extremities 44, 44 may serve as support fulcrums which by their abutment as at 46 (Figure 2) against the bottom of the bracket 32 may limit the rotational movement of the brake frame about the pivot point 30 thus carrying the brake frame when the associated wheel and axle assembly is removed for turning the wheels. The extremities 44, 44 also act as safety lugs for carrying one side of the brake frame in case of failure of the rubber spring assembly 38, in which case the safety lugs would seat on the torque bracket 32 at the bottom of the opening 42 already mentioned.

Adjacent each end of the tubular brake frame member 24 may be formed an enlarged portion or housing 48 having an open top closed by the cover plate 50, said cover plate being secured as at 52, 52. Each cover plate 50 may act as a carrier for the associated power means 54 (Figure 4), said power means being in the form of a double acting cylinder which may be secured as at 56, 56 to the cover plate 50 and having projecting therethrough a nipple 58 serving as a means of connection to an air line (not shown).

The housing 48 may project toward the adjacent axle and serve as an enclosure for the associated pair of brake lever 60, 60 which may project from said housing, the adjacent end of said housing being closed by the dust cover 61 (Figure 4). The levers 60, 60 may be fulcrumed from the housing 48 as at 62, 62 and pivotally support at their outer extremities as at 64, 64 the brake heads 66, 66 with their associated brake shoes 68, 68 arranged for frictional engagement with the opposite sides of the adjacent brake rotor 70. Each brake rotor 70 may have the novel form described in detail in my co-pending application, Serial No. 409,999, said rotor comprising a central disc which may abut the hub of the adjacent wheel as at 72 and be secured thereto by bolts 73, 73 (Figure 3) in any convenient manner. The ends of the brake levers 60 adjacent the cylinder 54 (Figure 4) may be formed with arcuate raised pads for abutment as at 71, 71 with the pistons 74, 74 at the opposite ends of the double acting cylinder 54, said cylinder thus serving as actuating means for said levers. Release means for said levers is in the form of the tension spring 76, the opposite ends of which may be connected as at 78, 78 to the respective levers.

The brake frame with its associated parts is shown in detail in Figures 4, 5, and 6. As illustrated, the torque arms 26, 26 at opposite ends thereof are integrally formed with the transverse beam 24 as by welding thereto as at 80, 80 and the form of the spaced torque brackets 34, 34 is well shown by a comparison of the views of Figures 4 and 5. Likewise, well illustrated in these figures is the housing 48 which serves as an enclosure not only for the double acting cylinder which may be supported from the top closure plate 50 but also for the brake levers 60, 60 as already described. The end of the housing 48 from which said levers project may be afforded a cover at 61 and said cover may be made dust tight by any convenient means including flexible attachments for said levers as at 82, 82.

Each brake head 66 is pivotally connected to its supporting lever as at 64 as already indicated and the said pivotal connection is afforded balance means to maintain the brake head in its properly adjusted position on the lever at all times. The said balance means comprises the bracket 84 which may be fixed as at 85 to the lever 60 adjacent the pivotal point of support of the brake head. Said bracket 84 comprises an eye-end 86 through which the brake head pivot pin 88 may extend, and outwardly of the bracket 84 may be positioned a balance spring 90 and securing means therefor in the form of the nut 92 which may be threaded on the end of the pivot pin 88. When properly adjusted as to compression of the spring 90, the brake head 66 will be restrained against free rotation about the p'n 88 but at the same time will readily adjust itself to varying operating conditions and will be maintained approximately in the position on the brake lever which it assumed as last applied to the adjacent rotor.

From the views of Figures 4, 5, and 6, the detailed form of the equalizer seat and the manner of connection thereto of the torque arm 26 may be noted. Each equalizer seat 28 is illustrated as a casting, the bottom face of the outboard portion of which may seat as at 94 (Figure 2, right) in the usual cavity afforded for the equalizer atop the journal box. In turn, the adjacent end of the equalizer 18 may rest on said outboard portion and be positioned thereon by the transverse rib 96 and restrained against lateral movement thereon by walls 98, 98. The inboard end of the seat casting 28 has a jaw-like form with inwardly projecting jaws and is arcuate in side elevation as may best be seen in the view of Figure 5. Confined within said jaw portion between the top and bottom walls 100 and 102 may be the rubber spring assembly 104. Said rubber spring assembly is made up of alternate arcuate layers of rubber and metal and the inner layers of metal may be flanged over as at 106, 106 and welded as at 108, 108 to the extremity of the adjacent torque arm 26 which may thereby be confined within the rubber spring. Also the top and bottom metallic layers 101 and 103 of the spring 104 may seat respectively against the walls 100 and 102 and be flanged over at their ends as at 105, 105 to properly confine the spring assembly 104 within said jaws. On the inboard face of the end of the torque arm may be secured a wear plate 110 which may abut as at 112 against the wall 114 of the seat casting 28, thus restricting relative lateral movement between the brake frame and the equalizer seats 28, 28 at opposite extremities thereof and thus insuring that the said brake frame will move laterally with the wheel and axle assembly and thereby keep in alignment with the brake rotor supported thereon, said alignment however being permitted the slight degree of resilient displacement illustrated. It will be observed that the arcuate shape of the extremities of the torque arm 26 which is confined within the rubber spring assembly 104 between the jaws 100 and 102 of the equalizer seat casting will sharply restrain any relative movement longitudinally of the truck between the torque arm and the equalizer seat. The extent of this movement and the purpose thereof in permitting a slight amount of it will be more clearly set forth in the detailed description of Figure 7.

My novel brake arrangement is designed for actuation by hand brake means, and Figure 8 illustrates the detail in manner in which hand brake means may operate with the already described power means. The structure shown in Figure 8 is substantially identical with that of Figures 4, 5, and 6 just described, except for the addition thereto of hand brake means, details of which may now be referred to.

It may be noted that my novel hand brake arrangement comprises an equalizer bar 116, the mid-point of which may be pivotally connected as at 118 to hand brake operating means (not shown) and the jaw ends of which may be pivotally connected as at 120, 120 to links 122, 122 which in turn are pivotally connected as at 124, 124 to the hand brake actuating levers 126, 126 and the actuating levers 126, 126 may be fulcrumed at their respective pivot points 62, 62 to the adjacent power actuated levers 60, 60. Support for the intermediate portion of the hand brake means is by means of the bracket assembly generally designated 128 comprising a horizontal top plate 130, horizontal portions of which may be welded as at 132, 132 (Figure 9) to the beam 24 and the intermediate downwardly directed flange 136 may likewise be welded to said beam as at 138, 138. The bracket structure is reinforced by the vertical rib 140, one end of which may be welded as at 138, 138 and the opposite end of which may likewise be welded as at 142, 142 to the horizontal plate 130. Superposed on the plate 130 may be the wear plate 144 upon which may be slidably carried the equalizer bar 116 and the adjacent ends of the actuating levers 126, 126 with their connecting links.

Each actuating lever 126 may be offset downwardly as at 146 as may best be observed by a consideration of the views of Figures 8 and 9 and may project through the central elongated slot 148 (Figure 11) formed in the adjacent lever 60 extending therebeyond in an end portion 150, said end portion having a diagonally arranged cam face interengagement as at 152 with the pivot ends of the links 154, 154 opposite ends of which may be secured at the pivot points 78, 78 to the respective power levers 60, 60, thus the links 154, 154 form a toggle joint, and power may be applied to said toggle joint by the cam engagement as at 152 as will be obvious. Certain details of this connection are shown in Figure 10 where it may be noted that the top and bottom guide blocks 156, 156 may be secured as at 158, 158 to the top and bottom walls 160 and 162 of the housing 48 and between said guide blocks may be confined the toggle connection formed between the links 154, 154, one of said links being formed with a jaw end receiving the extremity of the other link and a securing pin 164 therefore being retained in position by confinement between said guide blocks.

It will readily be understood by those skilled in the art that application of power to the equalizer bar 116 may rotate the actuating levers 126, 126 about their respective pivot points 62, 62 thus applying power from each lever 126 to the adjacent toggle and thus operating the power levers 60, 60 in a manner similar to that in which they are normally operated by the associated power means 54.

Certain details f the actuating lever 60 are shown in Figure 11, said figure being an elevational view thereof taken from that side of the lever which is adjacent a similar mating lever, two of which, of course, are required for each power means. Reference already has been made to the arcuate face 71 at the small end of the lever which affords engagement with the adjacent piston 74 (Figure 4) of the nearby power means, said arcuate face being so formed in order to permit the cylinder 54 to be slipped into position between the oppositely arranged power levers 60, 60 while said levers remain in normal assembled position, thus making it possible for the cylinder to be applied or removed without disturbing other portions of the brake rigging as may frequently be necessary in order to replace parts thereof. Each power lever 60 is formed as an integral bar having at the large end thereof the pivot opening 64 already referred to affording connection for the associated brake head and said pivot opening may be lined at opposite sides thereof by the flanged bushings 166, 166. Intermediate the ends of said lever may be formed an enlarged hub portion 168 through which may extend the opening for the fulcrum pivot at 62, bushed as at 170, 170 and the before-mentioned horizontal slot 148 may extend into said hub 168 and longitudinally therefrom toward the piston engaging end in a relatively narrow extremity 172 within which may be received the extremity of the adjacent link 154. Thus a pivotal connection is also afforded at 78 as already described and the opening at 78 may likewise be bushed as at 174. Adjacent the brake head pivot 64, the lever may also be drilled to afford the brake head balance arm connection at 85 as already described.

In Figure 7 I have illustrated somewhat diagrammatically an important operating feature of my novel brake arrangement. As is well known the truck frame comprising the transom 6 is afforded relative vertical movement with respect to the equalizers by virtue of resilient means which normally rest upon the equalizers and afford support for the superposed frame as already described. Thus the main frame may move upwardly and downwardly with respect to the equalizers and the journal boxes of the wheel and axle assemblies on which the equalizers are of course supported. The spring suspension system commonly set up is well known. In my novel arrangement I have provided a member 28, the detail of which is well shown by a comparison of the views of Figures 3 to 6 inclusive wherein said member rests upon the usual equalizer seat of the journal box (Figure 2) and on said member may be superposed the end of the adjacent equalizer, the equalizer end being keyed therethrough in usual manner. The member 28 also affords means for resilient connection of the adjacent torque arm 26 of the brake frame as has already been described. This resilient connection of the brake frame permits a certain degree of relative movement longitudinally of the truck of the wheel and axle assembly with respect to the brake frame and this movement is well illustrated in Figure 7. It may be understood also that the torque connection of the brake frame to the transom 6 is made resilient in manner already described and this three point resilient connection to relatively movable portions of the car truck both vertically and longitudinally thereof as well as in some degree laterally thereof not only permits the brake frame in general to follow the movements of the wheel and axle assembly but also to move relatively with respect thereto and this last-mentioned relative movement of the brake frame and the wheel and axle assembly is most notable as the main frame of the truck moves vertically with respect to the wheel and axle assembly and of course the equalizers, said movement being permitted by the normal vertical play of the spring suspension system of the truck. In Figure 7 is illustrated somewhat diagrammatically the brake rotor 70 concentrically secured about the axis 176 of the adjacent wheel and axle assembly and fixed with respect thereto so that the rotor coincides in movement with the wheel and axle assembly upon which it is mounted. There is also shown in full lines in Figure 7 the transom 6, the torque bracket 32 secured thereto, and the torque arm 26, the end of which may be connected to the member 28 which serves not only as an equalizer seat but also as a means of connecting and supporting the adjacent end of the brake frame. In full lines is also shown the brake shoe 68 which, when the parts are in normal position at rest, substantially coincides with that portion of the arcuate friction surface 178 of the rotor against which it seats for frictional engagement therewith.

In Figure 7 are also shown in dotted lines the several parts and the extreme positions they may assume in moving upwardly and downwardly relative to the normal position shown in full lines, the upper positions of the respective parts being represented, for example, as at 26A, 68A and the lower positions, for example, at 26B, 68B. It will be noted that as the truck frame moves upwardly with respect to the wheel and axle assembly, the torque arm is placed in compression resulting in a movement of the fulcrum pivot point 30 to the point indicated at 30A closer to the transom 6 and when movement in the reverse direction takes place the fulcrum point shifts to 30B as the truck spring suspension system is under maximum compression. This slight movement is resisted, of course, by the compression which takes place in the rubber spring 38 which surrounds the pivot at 30. It is important to note the relative positions which the brake shoe 68 assumes with respect to the adjacent braking surface 178 of the rotor 70. In other words, when the truck spring suspension is compressed to a maximum the brake shoe is at the position 68B and when the spring suspension is at the reverse extremity of its cycle, the brake shoe assumes the position 68A. In the meantime, the wheel and axle assembly being unsprung maintains its normal position, the axis of which is shown at 176 so that as a result of this relative movement between the rotor and the brake frame the brake shoe 68 bears against the brake surface 178 in what might be described as a washing or sweeping movement, that is to say, the shoe moves about both laterally and vertically on the braking surface 178 with respect to said surface and thus prevents the formation of concentric grooves in the shoe or the braking surface which otherwise would take place. This feature is an important part of my invention.

Heretofore in the description, I have referred to the fact that the torque arm 26 is secured eccentrically with respect to the axis 176 of the wheel and axle assembly on which it is supported in part. With respect to Figure 7, it may be noted that the arcuate jaw end portions of the member 28 are struck from the center 180 above the axis 176 of the associated wheel and axle assembly and therefor eccentric with respect thereto. The normal position of the member 28 with respect to the eccentric point 180 is shown in full lines. It will readily be understood that this eccentricity might be secured in any direction, namely, laterally with respect to the axis 176 or below instead of thereabove as I have actually shown it, the important factor being that a sufficient degree of eccentricity be present to permit the brake shoe to move about over the friction surface of the rotor or wash or sweep over said surface as I have described.

Also illustrated in Figure 7 is the extreme position of the parts which may be assumed when the wheel and axle assembly is removed, the said position of the parts being then shown respectively as 26C for the torque arm, 28C for the equalizer seat element, and 68C for the brake shoe. I have already referred to the fact that, in the lowered position assumed by said parts, as the wheel and axle assembly is removed the said parts are supported by the safety lugs 44, 44 (Figure 2) supported at the extremity of each torque bracket 34 rearwardly of the fulcrum point 30.

It will thus be seen that in my novel arrangement I have provided a brake frame suitable for application to one or more wheel and axle assemblies of a railway car truck, that I have so designed my brake arrangement as to facilitate its application and removal, as well as the necessary change of parts including the power means removably mounted therein, while at the same time accommodating wheel change without interfering with any of the parts associated with the brake equipment. I have also provided such a mounting arrangement as will eliminate wear of radial grooves in the braking shoes or the braking surfaces of the rotor and I have provided safety means for the brake arrangement as well as novel hand brake means for emergency use.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In an off-wheel brake arrangement, a wheel and axle assembly, a truck frame comprising a longitudinal member supported on said assembly and a transverse member resiliently mounted on said longitudinal member, spaced rotors fixed on said assembly, a brake frame eccentrically supported with respect to said assembly adjacent the ends thereof and having a pivotal torque connection to said transverse member, spaced power means mounted on said brake frame adjacent respective rotors, power levers fulcrumed in said brake frame at opposite sides of each power means, brake heads on said levers supporting shoes for engagement with opposite faces of the adjacent rotor, and hand brake means comprising links forming a toggle connection between adjacent power levers, actuating levers fulcrumed at the pivot points of certain of said power levers and having operative engagement with the pivots of said toggles, means connected between said actuating levers for simultaneous operation thereof, and means on said brake frame affording support for said hand brake means.

2. In an off-wheel brake arrangement, a wheel and axle assembly, a truck frame comprising a longitudinal member supported on said assembly and a transverse member resiliently mounted on said longitudinal member, spaced rotors fixed on said assembly, a brake frame eccentrically supported with respect to said assembly adjacent the ends thereof and having a pivotal torque connection to said transverse member, spaced power means mounted on said brake frame adjacent respective rotors, power levers fulcrumed in said brake frame at opposite sides of each power means, brake heads on said levers supporting shoes for engagement with opposite faces of the adjacent rotor, and hand brake means comprising links forming a toggle connection between adjacent power levers, actuating levers fulcrumed at the pivot point of certain of said power levers and having operative engagement at the pivots of said toggles, and means connected between said actuating levers for simultaneous operation thereof.

3. In a railway car truck, spaced wheel and axle assemblies, equalizers supported therebetween, a spring suspension resiliently supporting a main frame on said equalizers with transverse members intermediate said assemblies, rotors fixed on said assemblies, and brake means for each assembly comprising a rigid frame eccentrically supported with respect to said assembly adjacent opposite ends thereof and having pivotal torque connection with the adjacent member, spaced power levers fulcrumed in said rigid frame, power means on said rigid frame intermediate said levers for actuation thereof, brake shoes on respective levers for engagement with opposite sides of the adjacent rotor, and hand brake means for auxiliary actuation of said power levers, said hand brake means comprising links forming a toggle connection between said power levers, and an actuating lever fulcrum at the pivot point of one of said power levers and having means for engagement with said links at the pivot of said toggle.

4. In a brake arrangement for a vehicle comprising a vehicle frame and a supporting wheel and axle assembly including an axle and a member rotatable therewith, a brake frame supported from said vehicle adjacent said member, said brake frame comprising a cylinder housing with an opening in the top thereof, a cover plate for said opening, a cylinder supported from said cover plate within said housing, brake levers fulcrumed in said housing and carrying friction means for engagement with opposite sides of said member, and pistons in said cylinder in engagement with respective levers, said cylinder and pistons being removable through said opening and slidably disengageable from said housing and said levers while the levers remain in normal assembled relationship within the housing and while the pistons remain in normal assembled relationship within the cylinder.

5. An off-wheel brake arrangement for a railway car truck comprising a wheel and axle assembly, a transverse frame member resiliently supported and spaced therefrom, a brake frame resiliently and eccentrically supported with respect to said assembly adjacent the ends thereof and having pivotal and resilient torque connection with said member, a rotor fixed on said assembly presenting a braking surface intermediate said assembly and said member, and a brake shoe mounted on said brake frame and normally coinciding with said braking surface for engagement therewith, the parts of said brake arrangement being so constructed and arranged that the normal vertical movements of said member with respect to said assembly cause said brake shoe to be moved laterally and vertically in both directions with respect to said surface, thus effecting a sweeping action of said shoes on said surface.

6. In a railway car truck, spaced wheel and axle assemblies, equalizers supported therebetween, a spring suspension resiliently supporting a main frame on said equalizers with transverse members intermediate said assemblies, rotors fixed on said assemblies, and brake means for each assembly comprising a rigid frame eccentrically supported with respect to said assembly adjacent the ends thereof and having a resilient and pivotal torque connection with the adjacent transverse member, spaced power levers fulcrumed in said rigid frame, power means on said frame intermediate said levers for actuation thereof, and brake shoes on respective of said levers for engagement with opposite sides of the adjacent rotor, said power means comprising a double acting cylinder with pistons at opposite ends thereof engaging respective levers, said rigid frame being transversely movable with respect to said assembly.

7. In a railway car truck, a wheel and axle assembly, wheel connecting means, equalizer seats on said means, a truck frame comprising equalizers supported on said seats and a transverse member resiliently mounted on said equalizers, a brake frame eccentrically mounted with respect to said assembly by connection at spaced points to said seats and resilient torque engagement with said transverse member, a rotor fixed on said assembly, and a brake shoe mounted on said brake frame for engagement with said rotor, the connections of said brake frame with said seats comprising resilient means affording limited vertical, lateral and longitudinal movement of said brake frame with respect to said seats.

8. In an off-wheel brake arrangement, a wheel and axle assembly, a truck frame comprising a longitudinal member supported on said assembly and a transverse member resiliently mounted on said longitudinal member, spaced rotors fixed on said assembly, a brake frame resiliently and eccentrically supported with respect to said assembly adjacent opposite ends thereof and having a pivotal torque connection to said transverse member, spaced power means mounted on said brake frame adjacent respective rotors, power levers fulcrumed in said brake frame at opposite sides of each power means, and brake heads on said levers supporting shoes for engagement with opposite faces of the adjacent rotors, and release means for said power levers.

9. In an off-wheel brake arrangement, a wheel and axle assembly, a truck frame comprising a longitudinal member supported on said assembly and a transverse member resiliently mounted on said longitudinal member, spaced rotors fixed on said assembly, a brake frame resiliently and eccentrically supported with respect to said assembly and adjacent thereto with a connection to said transverse member, power means mounted on said brake frame adjacent respective rotors, power levers fulcrumed in said brake frame at opposite sides of each power means, and brake heads on said levers supporting shoes for engagement with opposite faces of each rotor.

10. In an off-wheel brake arrangement for a railway car truck, a wheel and axle assembly, a frame member resiliently supported and spaced therefrom, a brake frame comprising a beam parallel with said member and torque arms at opposite ends thereof, said brake frame having a three point resilient support comprising eccentric mountings for said torque arms with respect to said assembly adjacent respective ends thereof and an intermediate connection to said transverse member, a brake shoe mounted on said brake frame, and a rotatable braking surface supported from said assembly for engagement with said shoe intermediate said member and said assembly.

11. In a brake support, a member comprising a cylinder housing, spaced brake levers fulcrumed from said member and extending into said housing, and a removable cylinder and piston assembly in said housing comprising pistons engaging respective levers for actuation thereof, said assembly being slidably disengageable as a unit from said housing and levers while the levers remain in normal assembled relationship with respect to the housing.

12. In a brake arrangement for a railway car truck, a wheel and axle assembly, a frame member resiliently supported with respect to said assembly and spaced therefrom, a brake frame eccentrically and resiliently supported with respect to said assembly adjacent opposite ends thereof and movably connected to said member, a rotor mounted on said assembly and presenting a brake surface intermediate said member and the axis of said axle, and brake means supported on said frame for engagement with said surface.

13. In an off-wheel brake arrangement for a railway car truck, a wheel and axle assembly, a truck member supported therefrom, a rotor on said assembly presenting a brake surface intermediate said member and said assembly, a brake frame eccentrically supported with respect to said assembly and adjacent thereto with torque means pivotally connected to said member, and a safety bracket on said torque means underlying said member for engagement therewith and support of said brake frame when said wheel and axle assembly is disassociated therewith.

14. In a brake arrangement for a railway car truck, a truck frame having a transverse member, a wheel and axle assembly supporting a brake rotor, a brake frame resiliently and eccentrically supported with respect to said assembly adjacent opposite ends thereof and having a torque connection to said member, and a brake shoe carried on said brake frame for engagement with said rotor.

15. In a brake arrangement for a railway car truck, a truck frame, a supporting wheel and axle assembly, a brake frame resiliently and eccentrically supported with respect to said assembly adjacent opposite ends thereof and having torque means resiliently connected to said truck frame, a rotor mounted on said assembly, and shoes supported on said brake frame for engagement therewith.

16. In a brake arrangement for a railway car truck, a truck frame, a supporting wheel and axle assembly, a brake frame transversely movably and eccentrically supported with respect to said assembly and adjacent thereto and having a resilient torque connection to said frame, a rotor mounted on said assembly, and shoes supported on said brake frame for engagement therewith.

17. In a railway car truck comprising a frame member and a supporting wheel and axle assembly including an axle and a member rotatable therewith, spaced friction means for engagement with said rotatable member, a brake frame supported from said truck adjacent said assembly, brake levers pivotally fulcrumed from said brake frame and connected to respective friction means, links forming a toggle connection between said brake levers, an actuating lever fulcrumed at the pivot point of one of said brake levers and having means for engagement with said links at the pivot of said toggle, and means for actuating said actuating lever.

18. In a railway car truck comprising a frame member and a supporting wheel and axle assembly including an axle and a member rotatable therewith, spaced friction means for engagement with said rotatable member, a brake frame supported adjacent said assembly, brake levers pivotally fulcrumed from said brake frame and connected to respective friction means, links forming a toggle connection between said brake levers, an actuating level fulcrumed from said brake frame and having means for engagement with said links at the pivot of said toggle, and means for actuating said actuating lever.

19. In a railway car truck, a frame member, a supporting wheel and axle assembly, a rotor mounted thereon, spaced friction means for engagement with said rotor, a brake frame, means supporting said brake frame adjacent said assembly, said support means including a torque connection between said brake frame and said member, brake levers pivotally fulcrumed from said brake frame and connected to respective friction means, links forming a toggle connection between said brake levers, an actuating lever fulcrumed from said brake frame and having means for engagement with said links at the pivot of said toggle, means for actuating said actuating lever, and actuating means independent of said actuating lever and operatively connected to said brake levers.

20. In a brake arrangement, a vehicle frame resiliently supported from a wheel and axle assembly, a rotor thereon, journal means associated with said assembly, a brake frame, friction means thereon for engagement with the rotor, a connection between said brake frame and said journal means eccentrically supporting said brake frame with respect to said assembly, and a torque connection between said frames, all of said connections comprising resilient means permitting movement of said brake frame transversely with respect to said assembly.

21. In a brake arrangement for a vehicle comprising a vehicle frame spring-supported from a wheel and axle assembly, a brake surface rotatable with said assembly and disposed substantially radial to the axis thereof, a brake support member transversely movably and eccentrically supported with respect to said assembly, a resilient torque connection between said frame and said member, and friction means carried by said member for braking engagement with said surface.

22. In a brake arrangement, a vehicle frame resiliently supported from a wheel and axle assembly, a rotor mounted thereon, a brake frame adjacent said assembly, means supported from said assembly and resiliently supporting said brake frame eccentrically with respect to said assembly, means resiliently supporting said brake frame from said vehicle frame, and friction means carried on the brake frame for engagement with said rotor, all of said support means being formed and arranged to afford a washing movement for said friction means against said rotor during relative vertical movement between said assembly and said vehicle frame.

23. In a brake arrangement, a vehicle frame resiliently supported from a wheel and axle assembly, a rotor mounted thereon, a brake frame adjacent said assembly, means flexibly associated with said assembly and resiliently supporting said brake frame eccentrically with respect to said assembly, means resiliently supporting said brake from said vehicle frame, and friction means carried on the brake frame for engagement with said rotor, all of said support means being formed and arranged to afford a washing movement for said friction means against said rotor during relative vertical movement between said assembly and said vehicle frame, the first-mentioned support means comprising spaced resilient pads clamping therebetween each end of the brake frame.

24. In a brake arrangement, a vehicle frame resiliently supported from a wheel and axle assembly, a rotor mounted thereon, a brake frame adjacent said assembly, support means guided by said assembly and resiliently supporting said brake frame eccentrically with respect to said assembly, means resiliently supporting said brake frame from said vehicle frame, and friction means carried on the brake frame for engagement with said rotor, all of said support means being formed and arranged to afford a washing movement for said friction means against said rotor during relative vertical movement between said assembly and said vehicle frame, the first-mentioned support means comprising vertically spaced arcuate pads clamping therebetween a complementary portion of the brake frame adjacent each end thereof.

25. In an off-wheel brake arrangement for a railway car truck, a wheel and axle assembly, a truck member supported therefrom, a rotor on said assembly presenting a brake surface intermediate said member and said assembly, a brake frame supported at spaced points from said assembly with torque means pivotally connected to said member, and a safety bracket on said torque means underlying said member for engagement therewith and support of said brake frame when said wheel and axle assembly is dissociated therewith.

26. In a brake arrangement, a vehicle frame resiliently supported from a wheel and axle assembly, journal boxes associated therewith, a rotor on said assembly, a yoke-like brake frame adjacent thereto, friction means carried by said frame for engagement with the rotor, a jaw on each journal box receiving therewithin vertically spaced arcuate pads and a complementary end of said brake frame clamped between said pads, a pivotal and resilient torque connection between said frames, said torque connection and the engagement of the brake frame with said journal boxes affording a washing movement for said friction means against said rotor during braking engagement therewith and during relative vertical movement between said assembly and said vehicle frame, the engagement between the arcuate pads and the ends of said brake frame permitting movement thereof longitudinally of the vehicle frame and transversely of the wheel and axle assembly but resisting in shear said last-mentioned movement.

27. In a brake arrangement, a wheel and axle assembly, journal boxes associated therewith, a rotor on said assembly, a brake frame, means supporting said frame eccentrically with respect to said assembly and comprising rigid means on said frame resiliently connected to respective boxes, said resilient connections comprising spaced resilient means carried by each box and clamping therebetween the associated rigid means, friction means carried by said frame for engagement with said rotor, and torque means preventing excessive movement of said frame with regard to said assembly.

28. In a brake arrangement, a wheel and axle assembly, journal means antifrictionally associated therewith, a rotor on said assembly, a brake frame, means supporting said frame eccentrically with respect to said assembly and comprising rigid means on said frame resiliently connected to said journal means, friction means carried by said frame for engagement with said rotor, and resilient torque means preventing excessive movement of said frame with respect to said assembly.

29. In an equalizer seat, a substantially flat portion adapted to seat upon an associated journal box and adapted to support an end of an associated equalizer member, and a jaw formed on one side of said flat portion, said jaw being formed and arranged to receive an end portion of an associated brake frame.

30. In an equalizer seat, a substantially flat portion adapted to seat upon an associated journal box and adapted to support an end of an associated equalizer member, and a jaw formed on one side of said flat portion, said jaw being formed and arranged to receive an end portion of an associated brake frame, and vertically spaced resilient means secured within said jaw and adapted to clamp therebetween said end portion.

31. In a brake arrangement, a wheel and axle assembly, a rotor thereon, a brake frame supported substantially at the ends of said assembly, a cylinder housing on said frame, brake levers fulcrumed therein and carrying brake shoes for engagement with said rotor, a cylinder in said housing, pistons in said cylinder in engagement with respective levers, and torque means preventing excessive movement of said brake frame with respect to said assembly, said cylinder and pistons being slidably disengageable from said housing and said levers, while the levers remain in normal assembled relationship within the cylinder housing and while the pistons remain in normal assembled relationship within the cylinder.

32. In a brake support, a rigid member comprising a cylinder housing, spaced brake levers extending into said housing, means affording fulcrums for said levers, a readily removable cylinder within said housing, pistons in said cylinder in operative relationship with respective levers, said cylinder and pistons being slidably disengageable from said housing and said levers respectively, while the levers remain in normal assembled relationship within the housing and while the pistons remain in normal assembled relationship within said cylinder.

33. In a brake arrangement for a vehicle comprising a wheel and axle assembly including an axle and a member presenting a brake surface substantially radial to the axis thereof, and a vehicle frame spring-supported from said assembly, a brake support member adjacent said assembly, means supporting said support member from said assembly transversely movably and eccentrically with respect thereto, means affording a torque support for said support member from said vehicle frame, and friction means on said support member for braking engagement with said surface, said first and second-mentioned means being formed and arranged to afford a washing movement for said friction means against said surface during relative vertical movement between said assembly and said vehicle frame.

CARL E. TACK.